United States Patent [19]

Godkin

[11] 4,284,297

[45] Aug. 18, 1981

[54] METER RISER

[75] Inventor: Louis A. Godkin, Bethel, Conn.

[73] Assignee: Textron Inc., Providence, R.I.

[21] Appl. No.: 958,263

[22] Filed: Nov. 6, 1978

[51] Int. Cl.³ .............................................. F16L 55/00
[52] U.S. Cl. ........................................ 285/47; 285/55; 285/174
[58] Field of Search ....... 285/47, 55, 340 (U.S. only), 285/321 (U.S. only), 149, 174, 52

[56] References Cited

U.S. PATENT DOCUMENTS

| | | | |
|---|---|---|---|
| 2,739,615 | 3/1956 | Wurzel | 285/321 X |
| 3,101,207 | 8/1963 | Pavel et al. | 285/55 X |
| 3,236,543 | 2/1966 | Mueller | 285/55 X |
| 3,244,438 | 4/1966 | Bucheit | 285/55 X |
| 3,814,466 | 6/1974 | Leopold, Jr. | 285/55 |
| 3,922,008 | 11/1975 | Stiner et al. | 285/47 X |
| 3,987,820 | 10/1976 | Alewitz | 138/109 |
| 4,005,880 | 2/1977 | Anderson et al. | 285/47 |
| 4,062,572 | 12/1977 | Davis | 285/55 |
| 4,094,536 | 6/1978 | Cole et al. | 285/21 |
| 4,094,537 | 6/1978 | Lyall | 285/55 X |

FOREIGN PATENT DOCUMENTS 1522227  8/1978  United Kingdom .................... 285/55

Primary Examiner—Thomas F. Callaghan
Attorney, Agent, or Firm—Cifelli & Frederick

[57] ABSTRACT

A gas meter riser for conducting gas from an underground source of supply, such as a gas main, to a point of delivery above ground level, such as a meter or the like. The gas riser comprises a substantially totally plastic gas conduit formed by plastic tubing secured at one of its ends to an underground plastic service line. The tubing is surrounded by a protective and supporting metal pipe casing which extends partially above ground level and partially below ground level. The metal pipe casing, its lower end adapted to be disposed below ground level, is moisture sealed about the plastic tubing. The upper ends of the plastic tubing and metal pipe casing are adjacent and structurally secured to each other in sealed fashion by a plastic transition adapter and a cooperating metal fitting. The adapter, at its lower end, is secured to the upper end of the plastic tubing, and, at its periphery, sealingly engages the metal fitting which, in turn, is secured to the upper end of the metal pipe casing. The plastic transition adapter and metal fitting have interengaging shoulders to take up tensile stresses applied to the tubing and prevent its being pulled out of the fitting.

11 Claims, 4 Drawing Figures

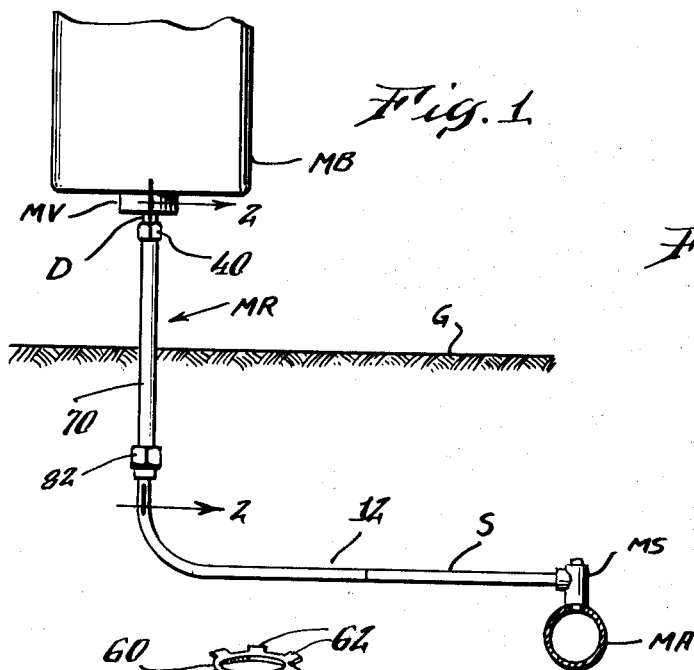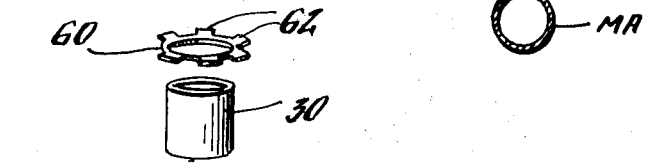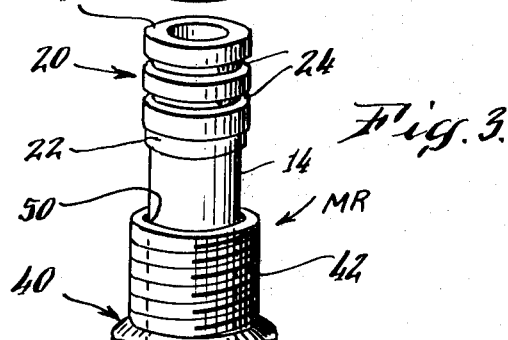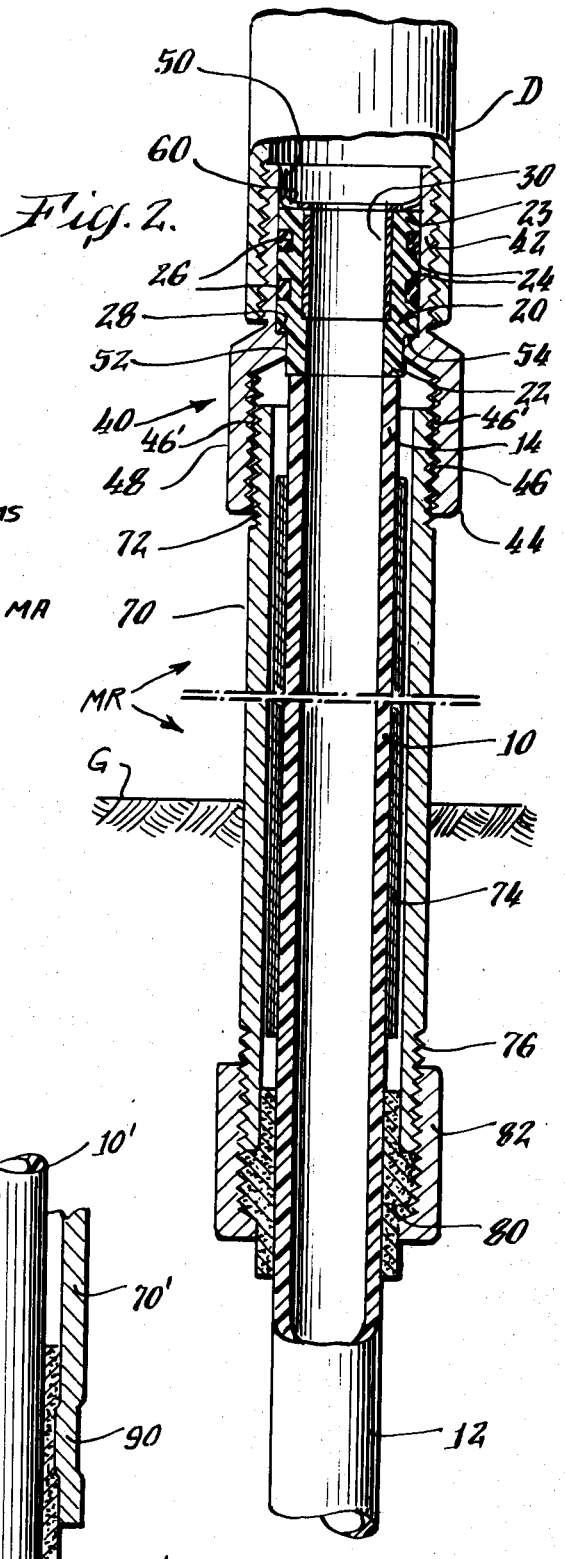

METER RISER

BACKGROUND OF THE INVENTION

This invention relates to gas meter risers for use with underground plastic service lines, in which the riser comprises an assembly capable of being handled as a unit for connection to the underground plastic service line which, in turn, is connected to the source of gas, such as a gas main, and to an above ground point of delivery, such as a meter or the like. Gas meter risers of the type involved historically have evolved from primarily all metal gas service lines which extended from an underground gas main to an above ground meter or the like. Corrosion of the service lines was a serious problem having public safety ramifications, and government regulations came into being, such as one requiring all underground steel gas lines to be protected against corrosion, as by having a protective coating and cathodic protection. There then developed a trend in the gas utility field of employing plastic pipe for gas service lines, and plastic service lines became quite prevalent. However, the utilization of plastic pipe gas carrying lines above ground level had the serious disadvantage of permitting the plastic pipe to be deleteriously affected by above ground level ambient conditions, such as heat. In fact, for some time a government regulation prohibited the usage of thermoplastic tubing as a gas carrier line in applications where temperatures in excess of 100° F. were likely to be encountered. This effectively precluded the use of plastic tubing as a gas carrier above ground. As a result, numerous complex expensive ground level gas meter riser devices of the so-called transition-type gas riser designs came into existence, such as the one disclosed in Lyall U.S. Pat. No. 4,094,537, in which gas is carried below ground by plastic tubing and above ground by metal pipe. These are expensive and involve multiple crimp, long engagement metal pipes on plastic tubing or plastic adapters. Another disadvantage of these ground level gas meter risers is that due to their incorporation of a transition means, they must be accurately positioned relative to the ground level to insure the proper disposition of the transition means relative thereto.

Government regulation changes ensued and presently they permit the utilization of thermoplastic tubing as a gas carrier in applications where temperatures up to 140° F. will be encountered and, therefore, now permit their use above ground. In view of cost and other factors, it has become apparent that it is highly desirable to employ thermoplastic tubing to the maximum degree possible for conducting gas from an underground gas main to an above ground gas meter. As used herein, the term "gas" is intended to encompass all pressurized fluids that are likely to be carried to and employed in residential or commercial locations, such as, but not limited to, natural gas, propane, butane, and the like. As used herein, the term "plastic" is intended to embrace, but not be limited to, thermoplastics, such as polyethylene.

SUMMARY OF THE INVENTION

A low cost maximum strength gas riser assembly for use to connect an underground plastic service line to an above ground level gas meter or the like without requiring precise positioning relative to the ground level is provided and essentially comprises a pair of concentric tubes, the inner one of plastic and constituting a plastic gas carrying conduit, and the outer one of metal pipe and constituting a metal protective and supportive casing for a portion of the gas carrying plastic tube. The gas riser assembly is adapted to be mounted partially above and partially below ground level and, as so mounted, the plastic tube extends out through the bottom of the metal casing to a point where it may be connected in any convenient manner, as by heat fusion, to the underground plastic service line. The lower end of the metal pipe casing is moisture sealed about a portion of the plastic tube. The upper ends of the plastic tube and metal pipe casing are adjacent and are structurally secured to each other in a sealed manner by a molded plastic transition adapter and cooperating metal fitting which are gas sealingly secured to each other. The plastic transition adapter is disposed within and supports O-rings that are compressed against the metal fitting. The plastic adapter is retained in the metal fitting by a spring finger type retaining washer, and is bonded to the upper end of the plastic tube, as by a fusion butt weld. The metal fitting is secured to the upper end of the metal pipe casing, as by a threaded pipe connection. The plastic transition adapter and the metal fitting have interengaging shoulders which absorb tensile strains that may be placed on the plastic tube to prevent the plastic tube from being pulled downwardly out through the fitting and metal pipe casing. An appropriate thermal insulator tube is disposed about the plastic tube in the space between the latter and the metal pipe casing.

Accordingly, it is an object of the invention to provide a low cost maximum strength functionally acceptable gas meter riser that employs a gas carrier in the form of an essentially totally plastic tube that is supported and protected by a metal casing, and which lends itself to easy assembly and mounting for operation.

BRIEF DESCRIPTION OF THE DRAWINGS

A more complete description of the invention will be made with reference to the attached drawings in which:

FIG. 1 is a schematic view showing the incorporation of the gas meter riser of this invention in the service line between an underground gas main and an above ground gas meter located, for example, at the side of a building;

FIG. 2 is an enlarged sectional view taken substantially on line 2—2 of FIG. 1 with the central portion of the meter riser broken away and shown in section;

FIG. 3 is an exploded view of the upper portion of the meter riser, and

FIG. 4 is a sectional view of the lower portion of a gas meter riser having a modified moisture seal.

DESCRIPTION OF THE INVENTION

The general environmental application of my application will be understood from FIG. 1, a schematic view showing my improved gas meter riser MR attached to the underground gas service line S which, in turn, is appropriately operatively connected to the gas main MA as by suitable intermediary components, such as stopcock MS. The upper end of the meter riser is connected to the meter MB as by suitable intermediary components, such as the delivery member D and meter stopcock MV.

The detailed construction of my improved meter riser MR will be understood from FIGS. 2 and 3. My improved meter riser includes a section of plastic tubing 10 which may be suitably formed of any acceptable plastic material, such as polyethylene, for transmitting pressurized fluids, such as natural or artificial gas. The lower end 12 of plastic tubing 10 constitutes a pigtail which may be suitably connected, as by heat fusion butt welding, to a gas conduit, such as the plastic service line S. The upper end 14 of the plastic tubing 10 is connected to transition adapter 20 which is generally cylindrical and may be molded of a suitable plastic material that is compatible with and may be fusion butt welded to the plastic tubing 10, for example, polyethylene. The adapter 20 has a reduced collar 22 which mates with and is secured, as by heat fusion butt welding, to the upper end 14 of the plastic tubing 10. The inner diameters of the plastic tubing 10 and adapter 20 in the vicinity of the connection are essentially the same. However, the outer diameter of the collar 22 is slightly larger than the outer diameter of the plastic tubing 10, hence the mating wall thickness of the adapter collar 22 is slightly greater than that of the plastic tubing wall thickness. The major upper portion 23 of the adapter 20 has a cylindrical inner surface slightly enlarged so as to accommodate a rigid metal sleeve 30. A pair of axially spaced annular grooves 24 are formed in the outer surface of the main portion of the adapter, and a pair of sealing O-rings 26 are disposed and carried in these grooves. The metal sleeve 30 functions, inter alia, to inhibit inner diameter changes of the adapter 20 as a result of ambient temperature changes and thereby maintains proper compression of the O-rings 26 when the transition adapter is fully assembled.

As described thus far, the section of plastic tubing 12 secured to the adapter 20 comprises the major portion of the conduit for conducting the pressurized fluid passing from the gas main MA through the service line S and upwardly through the meter riser MR. To connect the meter riser MR, including the plastic gas conduit just described, to a gas meter MB through its meter valve MV, my improved meter riser includes a rigid threaded connector fitting 40, which may be made of a suitable metal. Fitting 40 comprises an upwardly extending cylindrical collar portion 42 that is threaded on its exterior, and a lower enlarged diameter portion 44 having a cylindrical internally threaded socket portion 46 and an external tool receiving formation 48, illustrated as hexagonal, to facilitate assembly of the meter riser. Internally of the fitting 40, at its upper end, there is formed an inner cylindrical surface portion 50 of a diameter to receive the upper portion 23 of the adapter 20 with its assembled O-rings 26 in its grooves 24 with a tight fit and the O-rings in compression to effect a fluid-tight seal between the assembled transition adapter 20, plastic tubing 10 and the fitting 40. The adapter 20 with its associated parts is securely attached to the fitting 40 as by an apertured fingered spring-type retainer washer 60 having an inner aperture essentially the same diameter as the inner diameter of the sleeve 30, and making axial endwise contact with the upper end of the sleeve and the upper end of the adapter 20. The spring fingers 62 are configured to bittingly engage the fitting material forming the inner diameter 50 of the upper end of the fitting to effect a secure connection of the adapter in the fitting.

Between the upper inner diameter portion 50 and lower threaded socket portion 46 of the fitting 40 there is formed an annular internally inwardly extending rib 52 having a central opening of a diameter to receive in snug sliding engagement the collar 22 of the adapter 20. The previously mentioned slightly larger thickness of the mating collar 22 of the adapter 20 relative to the thickness of the plastic tubing 10 permits the assembly of the assembled tubing 10—adapter 20 through and relative to the rib 52 of the fitting. The assembly provides for interengagement of a downwardly facing shoulder 28, formed at the juncture of the adapter upper portion 23 and adapter collar 22, with an upwardly facing shoulder 54 formed on the fitting rib 52. The interengagement is such as to cause the shoulders to absorb all tensile forces and resulting stresses that may be applied to the transition adapter by movement of the plastic tubing 10, for example, those that may be caused in operation if accidental tensile forces are applied to the service line S.

The meter riser MR may be secured to the meter MB as by having the outer threaded collar portion 42 of the fitting 40 received in an inwardly threaded socket formed in a depending collar D forming part of a delivery member, such as the illustrated stopcock MV. Of course, it may be connected directly to an internally threaded socket of the meter of other associated components.

In addition to functioning as a means for securing and operationally connecting the pressurized fluid transmitting conduit formed by the service line S, the plastic tubing 10 and the plastic adapter 20 to a meter, the fitting 40 also functions to support a protective rigid pipe 70, which may be conveniently made of a suitable metal, which functions as a protective and support casing for the plastic tubing and its associated parts. The upper end of the pipe 70 is threaded at 72 and threadedly received within threaded socket 46 of the fitting 40. The internal diameter of the pipe 70 is such that it is spaced from the outer diameter of the plastic tubing 10 to thereby form a cylindrical air space which thermally insulates the plastic tubing 10 from the ambient temperature. To enhance the thermal insulation and prevent contact of the plastic tubing 10 with the pipe 70, an insulator tube 74 is disposed in the air space between the plastic tubing 10 and the pipe 70. The insulating tube 74 may be made of any convenient insulation material, such as thermal insulating plastic, and mounted within the pipe 70 about the plastic tubing 10 in any convenient manner. The lower end 76 of the pipe 70 is closed by a moisture seal 80 that is disposed about a portion of the plastic tubing 10 and compressed into moisture-sealing engagement therewith by a nut 82 that is internally threaded and screwed on to the threaded lower portion 76 of the pipe 70. An alternative moisture seal is shown in FIG. 4, which comprises an elastomeric seal 80' mounted about the portion of the plastic tubing 12' and having a crimp 90 formed at the lower end 76' of the pipe 70'.

The meter riser assembly as described functions to enable its ready assembly into the pressurized fluid carrying conduit between a gas main and a gas meter. Most of the fluid carrying conduit is formed by the plastic service line S, the section of plastic tubing 10 and plastic adapter 20. The plastic tubing 10 extends from below ground level to above ground substantially to the point of connection with the meter MB. The plastic tubing 10 is protected and supported by the metal pipe casing 70 which extends partially underground. A gas seal for preventing leakage of the fluid flowing from the gas main to the gas meter is provided between the adapter 20 and fitting 40 by the compressed O-rings 26. Entry of moisture into the meter riser is prevented by the moisture seal effected at the lower end 76 of the pipe casing 70 by the elastomer seal 80 and its compression nut 82. Overheating of the plastic tubing 10 disposed within the metal pipe casing 70 is prevented by the combined effect of the insulation air space between these parts, as well as the thermal insulating tube 74.

The improved fitting provides for the transition from the essentially completely plastic gas conduit to the cooperating metal components well above ground and thereby avoids expensive, complicated prior art, ground level transition fittings which usually involve long engagement by multiple crimps of external metal tubes on plastic tubing or molded adapters. The improved meter riser provides a low-cost, maximum-strength device which fully satisfies all the operational and governmental requirements for this type of device.

In order to enhance the durability of my improved gas meter riser, possible corrosion of the metal protective pipe casing 70 caused by electrolytic action resulting from possible ambient stray electrical current may be precluded by electrically isolating the casing 70 from the metal fitting 40. This may be optionally achieved, if desired, by disposing a suitable electrical insulating plastic, such as polyethylene, tube or film 46' between the cooperating threads of the casing 70 and socket portion 46 of the fitting 40. In addition to electrically isolating the casing from the fitting, the tube or film may function also as a moisture seal.

In view of the foregoing, it should be apparent that I have achieved the objects of this invention. As will be apparent to those skilled in the art, various changes and modifications of the invention can be made without departing from the spirit and scope of the invention, which is limited only by the following claims.

I claim:

1. A meter riser unit for use in a system for conducting pressurized fluid, such as gas, from a source, such as a gas main, below ground level to a point of delivery member, such as a gas meter or the like, disposed above ground level comprising:

an elongated continuous plastic tube having one of its ends adapted to be disposed below ground level to communicate with the source, as by being connected to an underground gas service line, and the other of its ends adapted to be disposed above ground level adjacent to and in communication with the point of delivery member, whereby said plastic tube constitutes an essentially completely non-metallic gas conducting conduit part of the riser;

an elongated rigid metal pipe casing of a larger diameter than said plastic tube concentrically spaced about a portion of said plastic tube; said casing being adapted to be disposed partially above and partially below ground level and having one end disposed adjacent to said other end of said plastic tube, and means including a separable unitary metal fitting and a plastic adapter connecting said adjacent ends to each other in fluid tight relationship whereby said casing supports and protects said plastic tube; said fitting comprising a portion arranged to be secured to said one casing end, and an inner cylindrical surface arranged to receive said plastic adapter; said plastic adapter secured to and communicating with said plastic tube; said plastic adapter being disposed within and engaging said inner cylindrical surface of said fitting; said fitting and said adapter having interengaging shoulders to prevent said plastic tube and said adapter from being pulled through said fitting into said casing, the shoulder on said adapter being formed at one end of said adapter; said fitting having an inwardly extending annular rib formed intermediate its ends; the shoulder on said fitting being formed at said rib; the portion of said adapter secured to said plastic tube being tubular and of an outside diameter to have a sliding fit within said rib; means for sealing the connection between said fitting and said adapter comprising an O-ring carried by said adapter in compressive sealing engagement with said fitting; and means for retaining said adapter in said fitting comprising a spring locking member disposed within said fitting and engaging the other end of said adapter.

2. A meter riser as defined in claim 1 which further includes a rigid metal sleeve mounted and disposed within said adapter in position to be within said inner cylindrical surface to inhibit inner diameter changes of said adapter during use of the meter riser.

3. A meter riser for conducting pressurized fluid, such as gas, from a source, such as a gas main, below ground level to a point of delivery member, such as a gas meter or the like, disposed above ground level comprising:

an elongated continuous plastic tube having one of its ends adapted to be disposed below ground level to communicate with the source, as by being connected to an underground gas service line, and the other of its ends adapted to be disposed above ground level adjacent to and in communication with the point of delivery member, whereby said plastic tube constitutes an essentially completely non-metallic gas conducting conduit part of the riser;

an elongated rigid metal pipe causing of a larger diameter than said plastic tube concentrically spaced about a portion of said plastic tube; said casing being adapted to be disposed partially above and partially below ground level and having one end disposed adjacent to said other end of said plastic tube, and means including a separable unitary fitting and a plastic adapter connecting said adjacent ends to each other in fluid tight relationship whereby said casing supports and protects said plastic tube; said fitting comprising a portion arranged to be secured to said one casing end, and an inner cylindrical surface arranged to receive said plastic adapter; said plastic adapter secured to and communicating with said plastic tube; said plastic adapter being disposed within and engaging said inner cylindrical surface of said fitting; said fitting and said adapter having interengaging shoulders to prevent said plastic tube and said adapter from being pulled through said fitting into said casing; said fitting having an inwardly extending annular rib formed intermediate its ends; the shoulder on said fitting being formed at said rib; the portion of said adapter secured to said plastic tube being tubular and of an outside diameter to have a sliding fit within said rib; means for sealing the connection between said fitting and said adapter; means for retaining said adapter in said fitting; and means for connecting said fitting portion to said one casing end.

4. A meter riser as defined in claim 3 wherein said adjacent ends are adjacent to the delivery member, and said fitting is arranged to be connected to the delivery member, whereby said other end of said plastic tube is disposed adjacent to the delivery member.

5. A meter riser as defined in claim 3 wherein moisture sealing means is disposed at the other end of said casing in operative sealing relationship with an adjacent portion of said plastic tube.

6. A meter riser as defined in claim 3 wherein thermal insulating means is disposed in the space between said casing and the portion of said plastic tube which it surrounds.

7. A meter riser as defined in claim 3 wherein said retaining means comprised a spring locking member disposed within said fitting.

8. A meter riser as defined in claim 3 wherein said tube is of slightly smaller diameter than that of the sliding portion of said adapter.

9. A meter riser as defined in claim 3 wherein an electrical insulating tube is disposed between said fitting and said casing to electrically isolate them.

10. A meter riser as defined in claim 3 which further includes a rigid metal sleeve mounted and disposed within said adapter in position to be within said inner cylindrical surface to inhibit inner diameter changes of said adapter during use of the meter riser.

11. A meter riser unit for use in a system for conducting pressurized fluid, such as gas, from a source, such as a gas main, below ground level to a point of delivery member, such as a gas meter or the like, disposed above ground level comprising:

an elongated continuous plastic tube having one of its ends adapted to be disposed below ground level to communicate with the source, as by being connected to an underground gas service line, and the other of its ends adapted to be disposed above ground level adjacent to and in communication with the point of delivery member, whereby said plastic tube constitutes an essentially completely non-metallic gas conducting conduit part of the riser;

an elongated rigid metal pipe casing of a larger diameter than said plastic tube concentrically spaced about a portion of said plastic tube; said casing being adapted to be disposed partially above and partially below ground level and having one end disposed adjacent to said other end of said plastic tube, and means including a separable unitary metal fitting and a plastic adapter connecting said adjacent ends to each other in fluid tight relationship whereby said casing supports and protects said plastic tube; said fitting comprising a portion arranged to be secured to said one casing end, and an inner cylindrical surface arranged to receive said plastic adapter; said plastic adapter secured to and communicating with said plastic tube; said plastic adapter being disposed within and engaging said inner cylindrical surface of said fitting; said fitting and said adapter have interengaging shoulders to prevent said plastic tube and said adapter from being pulled through said fitting into said casing, the shoulder on said adapter being formed at one end of said adapter; means for sealing the connection between said fitting and said adapter comprising an O-ring carried by said adapter in compressive sealing engagement with said fitting; and a rigid metal sleeve mounted and disposed within said adapter in position to be within said inner cylindrical surface to inhibit inner diameter changes of said adapter during use of the meter riser; and means for retaining said adapter in said fitting comprising a spring locking member disposed within said fitting and engaging the other end of said adapter.

* * * * *